Mar. 3, 1925.

R. P. WHITE

BAIL EAR FOR VESSELS

Filed Feb. 27, 1923

1,528,230

INVENTOR
Richard P. White,
BY
Thomas G. Steward,
ATTORNEY.

Patented Mar. 3, 1925.

1,528,230

UNITED STATES PATENT OFFICE.

RICHARD P. WHITE, OF CHICAGO, ILLINOIS.

BAIL EAR FOR VESSELS.

Application filed February 27, 1923. Serial No. 621,645.

*To all whom it may concern:*

Be it known that I, RICHARD P. WHITE, a citizen of the United States, residing at Chicago, in the county of Cook and State of Illinois, have invented certain new and useful Improvements in Bail Ears for Vessels, of which the following is a specification.

The invention relates to bail ears for vessels such as are made of earthen or pottery ware, the object of the invention being to provide a simple and reliable device whereby a bail may be attached to such a vessel without employment of additional devices, the bail ear or clip being itself provided with the means whereby it is secured to the vessel.

The vessel is provided with anchoring parts which are, preferably, integrant features thereof, and the bail ear is so constructed as to inter-lock with said anchoring parts when it is placed in position by the workman.

The invention will be best understood if reference is made to the accompanying drawing, in which—

Figure 1:
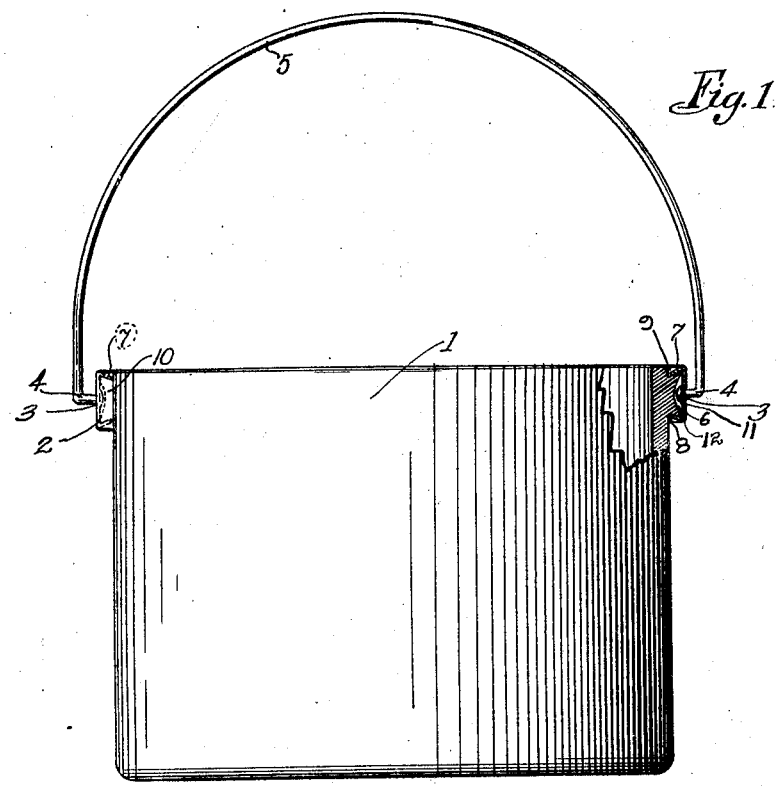
Figure 1 is a view of a vessel in elevation, parts including the invention being shown in section.

The vessel 1 is made of earthen-ware, glass or other suitable material, and is provided with diametrically disposed ears or clips 2 having perforations 3 in which the respective ends 4 of a bail 5 are pivoted, said ends 4 being upset or riveted at 6 to prevent their disengagement from the ears or clips 2.

The ears are secured to the vessel by their bent ends 7 which engage with inclined or convergent portions 8 of said vessel, these convergent portions being, preferably, the walls of cavities 9 formed in lugs 10 or some thickened part of said vessel. The ears 2 may be made of rather stiff spring metal to admit of their return to normal shape after being distorted by the act of applying them which requires the momentary separation of their bent ends 7.

Figure 2:
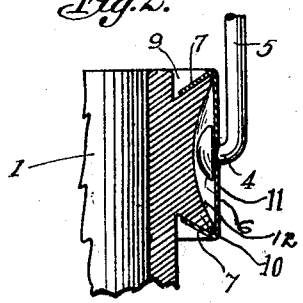
Figure 2 is a sectional view showing the ear, the bail and a part of the vessel on an enlarged scale.
Figure 3:
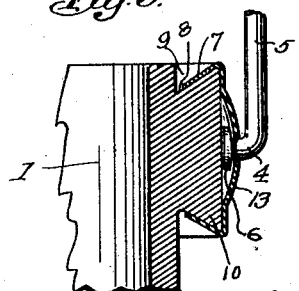
Figures 3 and 4 are similar views showing a slightly modified structure.
Figure 4:
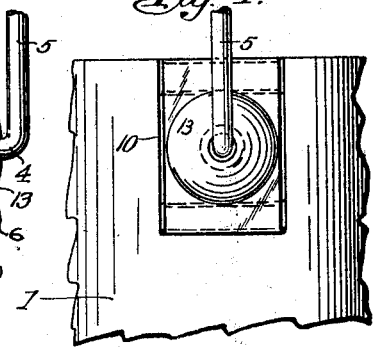

As shown in Figures 1 and 2, the ears 2 have flat faces 11, the lugs 10 being each provided with a depression 12 to accommodate the riveted end 6 of the bail, while, as shown in Figures 3 and 4, said depression 12 is omitted and space for the upset end 6 is afforded by providing each ear with a convex portion 13 within which said end is retained.

A suitable instrument, constituting no part of the invention, may be used to spread the bent ends 7 of the ears when said ears are applied to the vessel, provided spring metal is employed in their construction, and a slightly different instrument may be used for pressing said bent ends into the cavities in constructions wherein the ears are made of stiff non-resilient and pliable metal. The metal employed will, in any case, be of such gage as to firmly secure the ears to the vessel and prevent the ears from being pulled out of the cavities.

Having thus described my invention, what I claim and desire to secure by Letters Patent is:

The combination with an earthen-ware vessel having an unobstructed rim and provided with a part shaped to present exposed inwardly converging flat surfaces, of a metal bail ear provided with a bail opening and with converging flat members extending from the body of said bail ear and over and fitting said converging surfaces.

RICHARD P. WHITE.